(12) United States Patent
Ciabarra, Jr. et al.

(10) Patent No.: US 11,636,172 B2
(45) Date of Patent: *Apr. 25, 2023

(54) ACCURATE AND EFFICIENT RECORDING OF USER EXPERIENCE, GUI CHANGES AND USER INTERACTION EVENTS ON A REMOTE WEB DOCUMENT

(71) Applicant: Quantum Metric, Inc., Colorado Springs, CO (US)

(72) Inventors: Mario Luciano Ciabarra, Jr., Colorado Springs, CO (US); Yiduo Wang, Portland, OR (US)

(73) Assignee: Quantum Metric, Inc., Colorado Springs, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/336,156

(22) Filed: Jun. 1, 2021

(65) Prior Publication Data

US 2021/0397672 A1 Dec. 23, 2021

Related U.S. Application Data

(63) Continuation of application No. 16/206,876, filed on Nov. 30, 2018, now Pat. No. 11,036,823, which is a
(Continued)

(51) Int. Cl.
*G06F 16/958* (2019.01)
*G06F 40/14* (2020.01)
(Continued)

(52) U.S. Cl.
CPC .......... *G06F 16/986* (2019.01); *G06F 40/123* (2020.01); *G06F 40/14* (2020.01); *G06F 40/194* (2020.01)

(58) Field of Classification Search
CPC ............... G06F 16/986; G06F 17/2205; G06F 17/2211; G06F 40/14; G06F 40/123; G06F 40/194
See application file for complete search history.

(56) References Cited

U.S. PATENT DOCUMENTS

| 5,765,173 A | 6/1998 | Cane et al. |
| 5,794,254 A | 8/1998 | McClain |

(Continued)

FOREIGN PATENT DOCUMENTS

| CA | 2437281 C | 1/2011 |
| EP | 2291745 | 7/2013 |

(Continued)

OTHER PUBLICATIONS

U.S. Appl. No. 16/410,342, "Notice of Allowance", dated Sep. 10, 2021, 9 pages.
(Continued)

*Primary Examiner* — Kyle R Stork
(74) *Attorney, Agent, or Firm* — Kilpatrick Townsend & Stockton LLP

(57) ABSTRACT

The present disclosure describes how to capture events (e.g., changes and user interactions) of a Web document and combine those changes with the original DOM displayed to accurately and efficiently enable a replay engine to redisplay the DOM, changes, and user interactions which occurred within a user's browser. The data collected from a client-side HTML DOM capture engine can be combined with a minimal amount of contextual information to a replay engine so as to accurately and efficiently replay a session of a plurality of web documents.

30 Claims, 13 Drawing Sheets

Related U.S. Application Data continuation of application No. 14/984,102, filed on Dec. 30, 2015, now Pat. No. 10,146,752.

(60) Provisional application No. 62/098,951, filed on Dec. 31, 2014.

(51) Int. Cl.
  *G06F 40/123* (2020.01)
  *G06F 40/194* (2020.01)

(56) References Cited

U.S. PATENT DOCUMENTS

| | | |
|---|---|---|
| 6,012,087 A | 1/2000 | Freivald et al. |
| 7,269,784 B1 | 9/2007 | Kasriel et al. |
| 7,296,051 B1 | 11/2007 | Kasriel |
| 7,383,496 B2 | 6/2008 | Fukuda |
| 7,437,364 B1 | 10/2008 | Fredricksen et al. |
| 7,523,191 B1 | 4/2009 | Thomas et al. |
| 7,565,423 B1 | 7/2009 | Fredricksen |
| 7,587,398 B1 | 9/2009 | Fredricksen et al. |
| 7,640,262 B1 | 12/2009 | Beaverson et al. |
| 7,657,517 B2 | 2/2010 | Brown et al. |
| 7,668,880 B1 | 2/2010 | Carroll |
| 7,734,826 B2 | 6/2010 | Brown et al. |
| 7,765,274 B2 | 7/2010 | Kasriel et al. |
| 7,844,580 B2 | 11/2010 | Srivastava et al. |
| 7,941,525 B1 | 5/2011 | Yavilevich |
| 7,979,413 B2 | 7/2011 | Krishnamurthy et al. |
| 8,112,496 B2 | 2/2012 | Manasse et al. |
| 8,161,053 B1 | 4/2012 | Khan et al. |
| 8,224,964 B1 | 7/2012 | Fredrickson et al. |
| 8,230,510 B1 | 7/2012 | Yang et al. |
| 8,266,245 B1 | 9/2012 | Saviano et al. |
| 8,381,302 B1 | 2/2013 | Kennedy et al. |
| 8,423,616 B2 | 4/2013 | Pouzin et al. |
| 8,464,318 B1 | 6/2013 | Hallak |
| 8,528,043 B2 | 9/2013 | Hu |
| 8,595,187 B1 | 11/2013 | McLennan et al. |
| 8,627,344 B2 | 1/2014 | Tandriono et al. |
| 8,661,428 B2 | 2/2014 | Clark |
| 8,788,483 B2 | 7/2014 | Heuer et al. |
| 8,826,033 B1 | 9/2014 | Krishnaprasad et al. |
| 8,868,533 B2 | 10/2014 | Powell et al. |
| 8,914,324 B1 | 12/2014 | Guo et al. |
| 8,959,332 B2 | 2/2015 | Augenstein et al. |
| 9,112,826 B2 | 8/2015 | Gero |
| 9,153,239 B1 | 10/2015 | Postelnicu et al. |
| 9,471,285 B1 | 10/2016 | Koohgoli et al. |
| 9,503,540 B2 | 11/2016 | Athas et al. |
| 9,508,081 B2 | 11/2016 | Yavilevich |
| 9,633,062 B1 | 4/2017 | Vollmer |
| 9,684,668 B1 | 6/2017 | Guo |
| 9,785,722 B2 | 10/2017 | White et al. |
| 9,792,365 B2 | 10/2017 | Yavilevich |
| 9,917,894 B2 | 3/2018 | Tripathy et al. |
| 9,946,724 B1 | 4/2018 | Ghosh et al. |
| 9,959,577 B1 | 5/2018 | Mori |
| 9,971,940 B1 | 5/2018 | Sbaiz et al. |
| 10,063,645 B2 | 8/2018 | Yavilevich et al. |
| 10,079,737 B2 | 9/2018 | Schlesinger et al. |
| 10,146,752 B2 * | 12/2018 | Ciabarra, Jr. ......... G06F 40/194 |
| 10,318,592 B2 | 6/2019 | Ciabarra, Jr. et al. |
| 10,599,753 B1 | 3/2020 | Eisner et al. |
| 10,691,877 B1 | 6/2020 | Eisner et al. |
| 11,036,823 B2 * | 6/2021 | Ciabarra, Jr. ......... G06F 40/123 |
| 2002/0013825 A1 | 1/2002 | Freivald et al. |
| 2002/0138511 A1 | 9/2002 | Psounis et al. |
| 2002/0174180 A1 | 11/2002 | Brown et al. |
| 2003/0046260 A1 | 3/2003 | Satyanarayanan et al. |
| 2003/0172066 A1 | 9/2003 | Cooper et al. |
| 2003/0200207 A1 | 10/2003 | Dickinson |
| 2004/0025171 A1 * | 2/2004 | Barinov ............... G06Q 40/04 719/318 |
| 2004/0162885 A1 | 8/2004 | Garg et al. |
| 2004/0243936 A1 | 12/2004 | Fukuda |
| 2004/0249793 A1 | 12/2004 | Both |
| 2004/0267726 A1 | 12/2004 | Beynon et al. |
| 2005/0066037 A1 * | 3/2005 | Song ..................... G06F 16/95 709/227 |
| 2005/0203851 A1 | 9/2005 | King et al. |
| 2005/0262167 A1 | 11/2005 | Teodosiu et al. |
| 2005/0273592 A1 | 12/2005 | Pryor et al. |
| 2005/0283500 A1 | 12/2005 | Eshghi et al. |
| 2006/0112150 A1 | 5/2006 | Brown et al. |
| 2006/0184410 A1 | 8/2006 | Ramamurthy et al. |
| 2007/0130188 A1 | 6/2007 | Moon et al. |
| 2007/0226510 A1 | 9/2007 | Iglesia et al. |
| 2007/0288533 A1 | 12/2007 | Srivastava et al. |
| 2008/0033913 A1 | 2/2008 | Burn |
| 2008/0091845 A1 | 4/2008 | Mills et al. |
| 2008/0208979 A1 | 8/2008 | Vishwanath et al. |
| 2008/0235200 A1 | 9/2008 | Washington et al. |
| 2008/0243898 A1 | 10/2008 | Gormish et al. |
| 2008/0243992 A1 | 10/2008 | Jardetzky et al. |
| 2008/0270436 A1 | 10/2008 | Fineberg et al. |
| 2009/0012984 A1 | 1/2009 | Ravid et al. |
| 2009/0013414 A1 | 1/2009 | Washington et al. |
| 2009/0177959 A1 * | 7/2009 | Chakrabarti ......... G06F 16/951 715/234 |
| 2009/0196296 A1 | 8/2009 | Vachuska |
| 2009/0228680 A1 | 9/2009 | Reddy et al. |
| 2009/0248793 A1 | 10/2009 | Jacobsson et al. |
| 2009/0271779 A1 | 10/2009 | Clark |
| 2009/0299994 A1 | 12/2009 | Krishnamurthy et al. |
| 2010/0088551 A1 | 4/2010 | Berkner et al. |
| 2010/0095208 A1 | 4/2010 | White et al. |
| 2010/0222902 A1 * | 9/2010 | Eldridge ......... G05B 19/41845 700/86 |
| 2011/0066628 A1 | 3/2011 | Jayaraman |
| 2011/0119327 A1 | 5/2011 | Masuda |
| 2011/0173589 A1 | 7/2011 | Guttman et al. |
| 2011/0246879 A1 | 10/2011 | White et al. |
| 2011/0252100 A1 | 10/2011 | Raciborski et al. |
| 2011/0252305 A1 | 10/2011 | Tschani et al. |
| 2011/0314070 A1 | 12/2011 | Brown et al. |
| 2011/0320880 A1 | 12/2011 | Wenig et al. |
| 2012/0016882 A1 | 1/2012 | Tofano |
| 2012/0060082 A1 | 3/2012 | Edala et al. |
| 2012/0084333 A1 | 4/2012 | Huang et al. |
| 2013/0013618 A1 | 1/2013 | Heller et al. |
| 2013/0013859 A1 | 1/2013 | Zhu et al. |
| 2013/0031056 A1 | 1/2013 | Srivastava et al. |
| 2013/0124472 A1 | 5/2013 | Srivastava et al. |
| 2013/0132833 A1 | 5/2013 | White et al. |
| 2013/0138620 A1 | 5/2013 | Yakushev et al. |
| 2013/0138775 A1 | 5/2013 | Shah |
| 2013/0185387 A1 | 7/2013 | Gero |
| 2013/0188926 A1 | 7/2013 | Rajagopalan |
| 2013/0232187 A1 | 9/2013 | Workman et al. |
| 2013/0238730 A1 | 9/2013 | Nir et al. |
| 2013/0262567 A1 | 10/2013 | Walker et al. |
| 2013/0275479 A1 | 10/2013 | Thadikaran et al. |
| 2013/0332398 A1 | 12/2013 | Wu et al. |
| 2013/0346374 A1 | 12/2013 | Wolf et al. |
| 2014/0032513 A1 | 1/2014 | Gaither |
| 2014/0074783 A1 | 3/2014 | Alsina et al. |
| 2014/0137052 A1 | 5/2014 | Hernandez et al. |
| 2014/0181034 A1 | 6/2014 | Harrison et al. |
| 2014/0259157 A1 | 9/2014 | Toma et al. |
| 2014/0358938 A1 | 12/2014 | Billmaier et al. |
| 2014/0379823 A1 | 12/2014 | Wilsher et al. |
| 2015/0033120 A1 | 1/2015 | Cooke et al. |
| 2015/0067031 A1 | 3/2015 | Acharya et al. |
| 2015/0120804 A1 | 4/2015 | Eschbach |
| 2015/0134669 A1 * | 5/2015 | Harris ................ G06F 16/955 707/741 |
| 2015/0142756 A1 | 5/2015 | Watkins et al. |
| 2015/0181269 A1 | 6/2015 | McMillan |
| 2015/0207837 A1 * | 7/2015 | Guerrera ............ H04L 65/762 709/203 |
| 2015/0261653 A1 | 9/2015 | Lachambre et al. |
| 2015/0278384 A1 | 10/2015 | Butt et al. |

(56) References Cited

U.S. PATENT DOCUMENTS

| | | | |
|---|---|---|---|
| 2015/0286511 A1* | 10/2015 | Mickens | G06F 9/544 |
| | | | 719/320 |
| 2015/0347615 A1 | 12/2015 | McGushion et al. | |
| 2015/0356116 A1 | 12/2015 | Lin et al. | |
| 2016/0055196 A1 | 2/2016 | Collins et al. | |
| 2016/0188411 A1 | 6/2016 | Bortnikov et al. | |
| 2016/0188548 A1 | 6/2016 | Ciabarra, Jr. et al. | |
| 2016/0205221 A1 | 7/2016 | Gero | |
| 2016/0308941 A1 | 10/2016 | Cooley | |
| 2016/0320945 A1 | 11/2016 | Brunn et al. | |
| 2017/0011049 A1 | 1/2017 | Venkatesh et al. | |
| 2017/0017650 A1 | 1/2017 | Ciabarra, Jr. et al. | |
| 2017/0019489 A1 | 1/2017 | Churchill | |
| 2017/0192876 A1 | 7/2017 | Lachambre et al. | |
| 2017/0323026 A1 | 11/2017 | Le Bras et al. | |

FOREIGN PATENT DOCUMENTS

| | | |
|---|---|---|
| EP | 3323053 | 5/2018 |
| GB | 2425194 | 10/2006 |
| WO | 02075539 A2 | 9/2002 |

OTHER PUBLICATIONS

U.S. Appl. No. 14/984,102, "Final Office Action", dated Feb. 1, 2018, 19 pages.

U.S. Appl. No. 14/984,102, "Non-Final Office Action", dated Aug. 14, 2017, 18 pages.

U.S. Appl. No. 14/984,102, "Notice of Allowance", dated Jul. 31, 2018, 5 pages.

U.S. Appl. No. 15/212,569, "Non-Final Office Action", dated May 23, 2018, 37 pages.

U.S. Appl. No. 15/212,569, "Notice of Allowance", dated Jan. 30, 2019, 23 pages.

U.S. Appl. No. 16/206,876, "Final Office Action", dated May 19, 2020, 17 pages.

U.S. Appl. No. 16/206,876, "Non-Final Office Action", dated Sep. 25, 2020, 17 pages.

U.S. Appl. No. 16/206,876, "Non-Final Office Action", dated Dec. 23, 2019, 22 pages.

U.S. Appl. No. 16/206,876, "Notice of Allowance", dated Mar. 19, 2021, 5 pages.

U.S. Appl. No. 16/410,342, "Non-Final Office Action", dated Mar. 17, 2021, 36 pages.

European International Application No. EP16825308.6, "Extended European Search Report", dated Jun. 4, 2018, 11 pages.

Fu et al., "Application-Aware Client-Side Data Reduction and Encryption of Personal Data in Cloud Backup Services", Journal of Computer Science and Technology, vol. 28, Issue 6, Nov. 2013, pp. 1012-1024.

Liu et al., "ADMAD: Application-Driven Metadata Aware Deduplication Archival Storage System", Storage Network Architecture and Parallel I/Os,, Sep. 2008, pp. 29-35.

Lo et al., "Imagen: Runtime Migration of Browser Sessions for JavaScript Web Applications", World Wide Web. International World Wide Web Conferences Steering Committee. Republic and Canton of Geneva Switzerland, May 13, 2013, pp. 815-825.

Mogul et al., "Potential Benefits of Delta Encoding and Data Compression for HTTP", Proceedings of the 1997 ACM SIGCOMM Conference, Sep. 1997, pp. 181-194.

PCT International Application No. PCT/US2016/042776, "International Preliminary Reporton Patentability", dated Jan. 25, 2018, 12 pages.

Savant et al., "Server-Friendly Delta Compression for Efficient Web Access", Proceedings of the International Workshop on Web Content Caching and Distribution, Sep. 2003, pp. 303-322.

Tridgell, "Efficient Algorithms for Sorting and Synchronization", Thesis at the Australian National University, Feb. 1999, 115 pages.

Declaration of Michael Shamos, Ph.D., Accurate and Efficient Recording of User Experience, GUI Changes and User Interaction Events on a Remote Web Document, Content Square EX 1002, dated Jun. 15, 2021, pp. 1-122.

Document Object Model (DOM) Level 3 Core Specification, Version 1.0, W3C Recommendation, Apr. 7, 2004, pp. 1-216.

JavaScript Bible, Content Square EX 1017, 2001, pp. 1-32.

Case IPR2022-01167, Notice of Filing Date Accorded to Petition and Time for Filing Patent Owner Preliminary Response, Before the Patent Trial and Appeal Board, *Content Square SAS*, Petitioner, v. *Quantum Metric, Inc.*, Patent Owner, Patent 11,036,823, Paper No. 3, dated Jul. 15, 2022, pp. 1-5.

Case No. 1: 20-CV-00832-VAC, *Content Square SAS et al.* v. *Quantum Metric*, D.I. 38, [Proposed] Scheduling Order, dated Apr. 12, 2021, pp. 1-17.

Case No. 1:20-CV-00832-VAC, *Content Square SAS et al.* v. *Quantum Metric, Inc.*, D.I. 60, Notice of Electronic Filing, dated Mar. 25, 2022, EX 1016, p. 1.

Case No. 1:20-CV-00832-VAC, *Content Square SAS et al.* v. *Quantum Metric, Inc*, D.I. 36, Demand for Jury Trial, dated Apr. 1, 2021, pp. 1-20.

Case No. 1:20-CV-00832-VAC , *Content Square SAS et al.* v. *Quantum Metric, Inc.*, D.I. 59, Stipulation and [Proposed] Order to Stay Pending Inter Partes Review, dated Aug. 9, 2021, pp. 1-3.

Case No. IPR2022-01167, Petitioner's Power of Attorney Under 37 C.F.R. § 42.10(b), *Content Square SAS*, Petitioner v. *Quantum Metric, Inc.*, Patent Owner, U.S. Pat. No. 11,036,823 B2, Before the Patent Trial and Appeal Board, and Petition for Inter Partes Review of U.S. Pat. No. 11,036,823, issued Jun. 15, 2021, pp. 1-89.

IPR2022-00476 , Paper No. 6, Notice of Filing Date Accorded for IPR Petition, *Quantum Metric, Inc. et al.* v. *Clicktale Ltd*, dated Mar. 10, 2022, Content Square EX 1012, pp. 1-6.

Smith et al., "Creating Web Pages for Dummies," 7th Edition, 2004, pp. 1-19.

\* cited by examiner

350 Original document

```
<div id="center_window">
    <div id="response">
        <span>Your application status is:</span>
        <span style="color: blue">pending</span>
    </div>
</div>
```

360 Document after modification

```
<div id="center_window">
    <div id="response">
        <span>Your application status is:</span>
        <span style="color: blue">approved</span>
    </div>
</div>
```

FIG. 3B

580 Original document:

```html
<div id="center_window">
    <div id="response">
        <span>Your application status is:</span>
        <span style="color: blue">pending</span>
    </div>
</div>
```

590 Document after modifications:

```html
<div id="center_window">
    <div id="response">
        <span>Your application status is:</span>
        <span style="color: blue">
            <span>Error - Please select from the following options:
                <ol>
                    <li><a href="#">Followup Call</a></li>
                    <li><a href="#">Send letter in mail</a></li>
                </ol>
            </span>
        </span>
    </div>
</div>
```

FIG. 5B

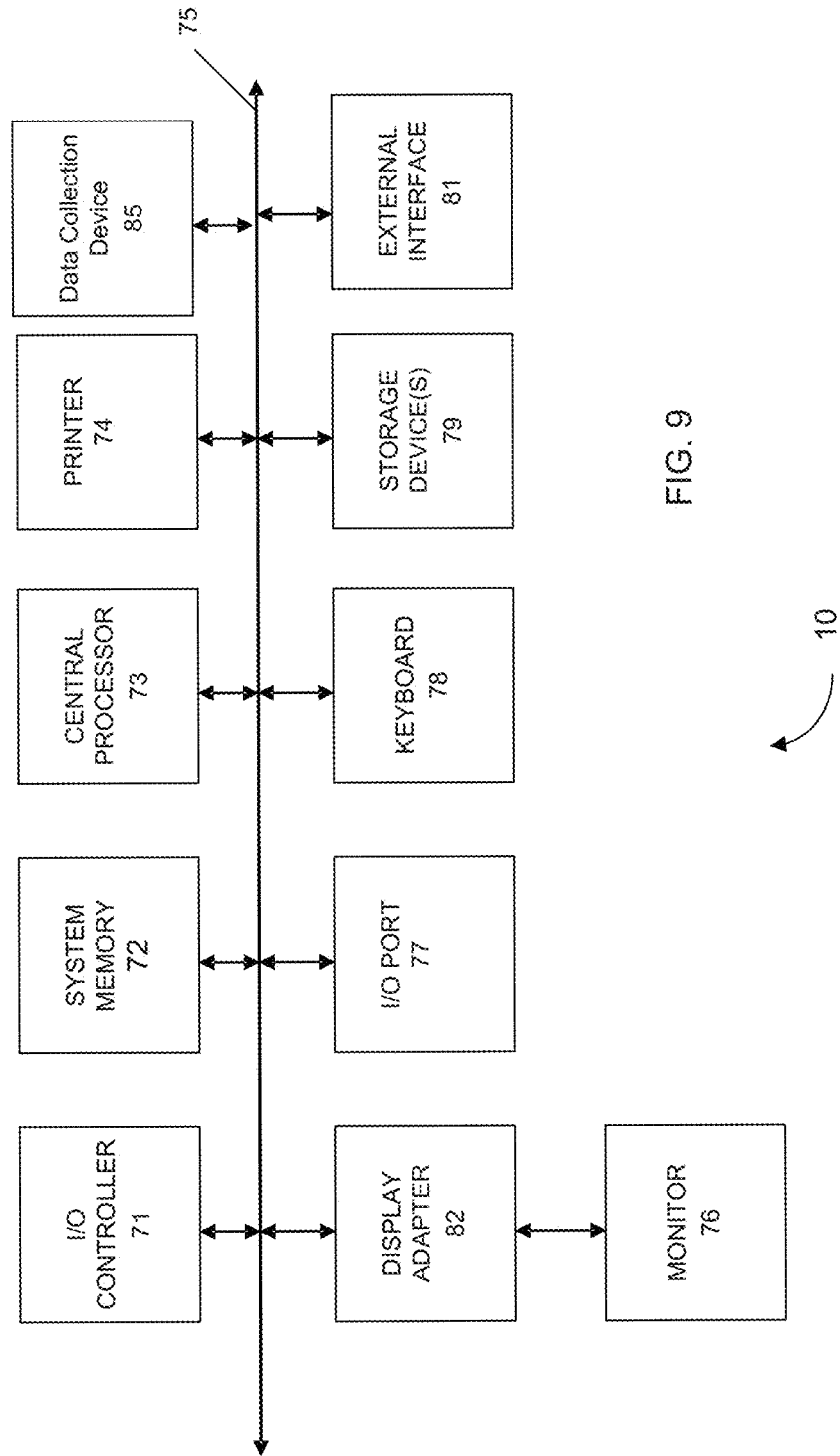

ACCURATE AND EFFICIENT RECORDING OF USER EXPERIENCE, GUI CHANGES AND USER INTERACTION EVENTS ON A REMOTE WEB DOCUMENT

CROSS-REFERENCES TO RELATED APPLICATIONS

The present application is a continuation of, and claims the benefit and priority to U.S. application Ser. No. 16/206,876, filed Nov. 30, 2018, entitled "ACCURATE AND EFFICIENT RECORDING OF USER EXPERIENCE, GUI CHANGES AND USER INTERACTION EVENTS ON A REMOTE WEB DOCUMENT", now allowed, which claims the benefit and priority to U.S. application Ser. No. 14/984,102, filed Dec. 30, 2015, now U.S. Pat. No. 10,146,752, which claims the benefit and priority under 35 U.S.C. 119(e) of U.S. Provisional Application No. 62/098,951, filed Dec. 31, 2014, the entire contents of which are incorporated herein by reference for all purposes.

FIELD

The present disclosure relates generally to capturing dynamic real-time changes to a web document within a browser. More specifically, the present disclosure relates to systems and methods for the remote capture of user interaction events and web document or graphical user interface changes within a web document for user experience analysis, playback, and statistical analysis.

BACKGROUND

Since the introduction of client-side web technologies such as JavaScript, web documents have become increasingly dynamic, allowing users to interact directly with the web document without the browser making time-consuming requests to a server for each content change. Interacting with a data table to sort columns or filter data, changes to the Document Object Model (DOM) element opacity/location/dimensions/content, and asynchronously fetching and displaying data are just some examples of how web documents have become progressively richer with dynamic content and interactions.

Because web document content can be modified within the user's browser, website developers and providers do not have a clear insight into how their audience is using and interacting with the web documents or web applications. Despite having created the web document content, but because of the large amount of permutations of how users can interact with an individual document or groups of documents, providers, designers, operators, and web document creators seek an accurate and efficient way to capture how users interact with their web documents to playback and analyze the remote interactions. Traditionally, the network to desktop browsers was viewed as reliable and adhering to fairly consistent and predictable performance patterns. In the new environment where users increasingly access data from any device, and over widely varying network conditions, the proposition that performance is consistent is no longer valid. Users may see only partial content before getting frustrated and leaving a page or website. They may get frustrated due to content that does not even come from the primary website, but instead is sourced from Content Distribution Networks or external advertising or social media sites.

Products can capture graphical user interface changes on a remote web document. Current capture systems have approached analysis of remote web document events first using log files, and later using either server-side packet capture systems or a client-side capture agent communicating with a server-side storage and analysis system. An advantage exists in combining the server-side packet capture and client-side capture agent, as both capture overlapping data, and the most recent art has not been able to make efficient use of combining the two methods Attempts to keep a client-side capture agent's data in sync with a replay engine have met various challenges, such as client-side plugins or server-delivered scripts that modify the DOM prior to document load completion and changes to adjacent text nodes resulting in a merging of a node during replay. To compensate for these challenges, systems have been required to send a new copy of the entire DOM or HTML as viewed by the remote browser back to the server-side web session storage and analysis engine, sometimes more than once on a single document to "sync" the replay engine with the actual document being viewed remotely with the client-side capture agent. However, this inefficiency of sending the full HTML from the client both consumes additional client bandwidth and can slow other interactions, for example, the client web browser fetching the next document or new data.

Products can also capture user interaction events on a remote web document. Specifically with respect to capturing mouse clicks and mouse movement, systems have approached tracking of these type of events by capturing the Cartesian coordinates where a mouse moves, and the Cartesian coordinates of where a user performs mouse clicks. This has been moderately effective in the past. However, as the number of devices used to access web documents increase and the number of varying screen displays increases, web designers have transitioned to a more dynamic, or responsive, document design, where the content layout changes dynamically based on the client's screen size. As such, simply capturing Cartesian coordinates is ineffective and inaccurate at helping web operators and designers analyze how users interact with their document, as the results are not clear with respect to what the user clicked or what content a mouse went over, in, or out of.

Therefore, it is desirable to provide new techniques that address these and other problems.

BRIEF SUMMARY

Embodiments provide systems, methods, and apparatuses to accurately and efficiently capture events of a Web document at a client device and send the events to a server-side capture engine, which can combine the events to reassemble the events. For example, user interface and user interaction events on a remotely displayed web document can be reassembled for the purpose of playback and analysis.

In some embodiments, only minimal DOM node modifications are sent without sending the entire DOM tree, while ensuring the DOM model is accurately represented in the server-side storage and analysis system. Additionally, user interaction events such as mouse moving, scrolling, mouse clicks, and keyboard entries can be sent using unique DOM identifiers to accurately playback the events with respect to the content elements that occurred on a remote browser. Embodiments can address many challenges with the complete, yet minimal, capture set required for accurate playback and analysis of user interface and user interaction events, with efficient use of network communication.

Other embodiments are directed to systems and computer readable media associated with methods described herein.

A better understanding of the nature and advantages of embodiments of the present invention may be gained with reference to the following detailed description and the accompanying drawings.

BRIEF DESCRIPTION OF THE DRAWINGS

FIG. 3B illustrates an example HTML modification.

FIG. 5B illustrates an example HTML modification with multiple node modifications.

FIG. 9 shows a block diagram of an example computer system 10 usable with system and methods according to embodiments of the present invention.

DETAILED DESCRIPTION

Efficient and accurate capture of user interactions and graphical user interface changes is needed for playback and analysis of web document sessions. There has been a large shift towards access via tablet, mobile, and other non-desktop devices over the last five years. Existing methods do not recognize the unique challenges of capturing and recording user interaction data in this new reality. Embodiments of the present invention have several new innovations that address the challenges of a multi-device reality. In addition, many sites now rely on advertising and/or social media for a substantial portion of the business value. Existing methods also fail to recognize this requirement, and do not provide any insight into how external content is impacting what the user encounters.

Methods and systems for accurate and efficient capture of a web document graphical user interface events (e.g., changes and user interactions) are described. Embodiments can address the inefficiency of sending the entire DOM or HTML by only sending the necessary DOM changes back to the server, and suppressing duplicate information. Embodiments can also address inaccuracies in capturing user interactions by sending specific DOM node identifiers as part of identifying mouse movements and mouse clicks. Some embodiments can replay without any prior configuration or instrumentation of the server-side DOM capture engine.

Embodiments can record everything sent from both sides, both from the server and the client for a specific IP address. One can then pull up the page that the user actually saw (and thus display the pages that the user saw) and replay the steps and interactions the user took (e.g., a stock trade for a financial company). The determination of the actual displayed page can be done even for dynamic web pages. This can be done by listening to those changes and sending the changes back to a server in an efficient manner. Embodiments can link the DOM originally sent by the server with small changes and user interactions on the front end.

I. System

Figure 1:
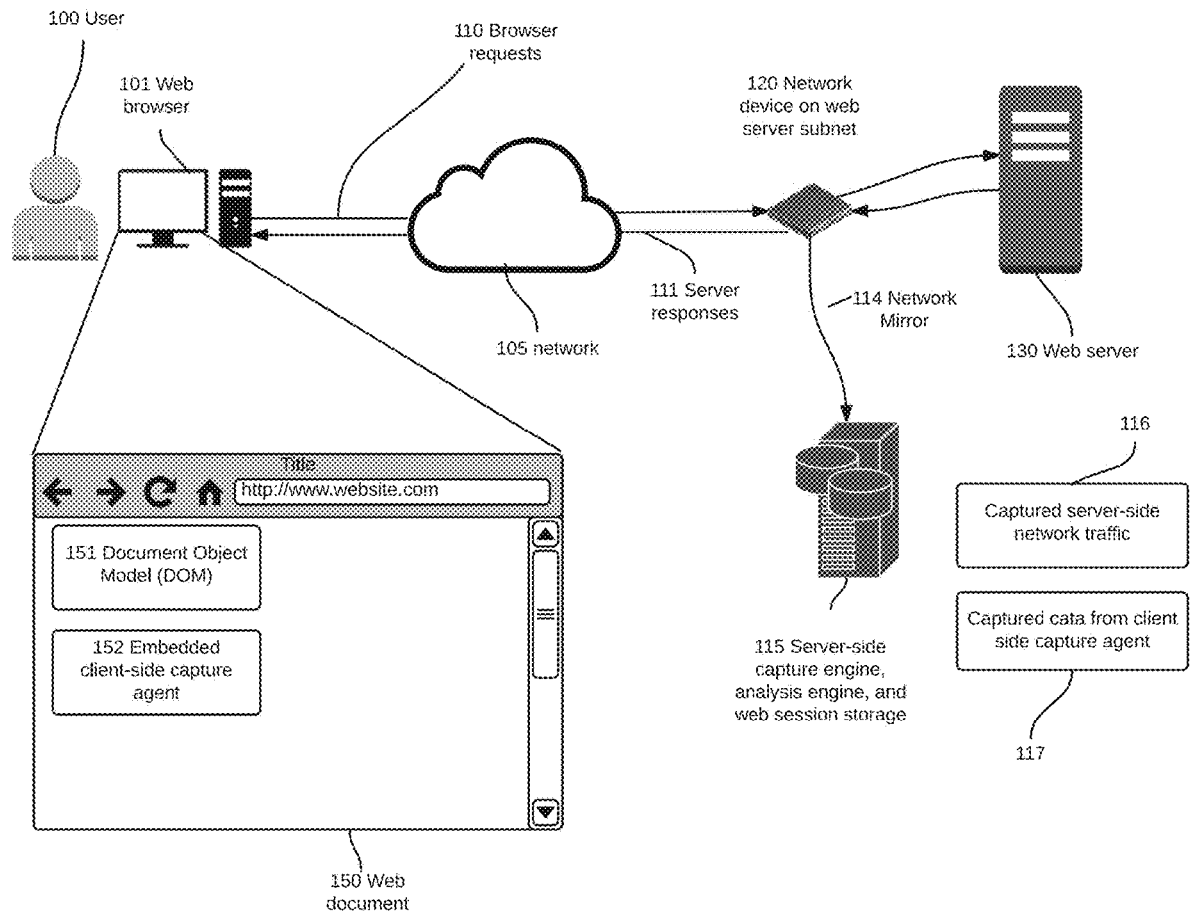
FIG. 1 illustrates the architectural components according to embodiments.

FIG. 1 illustrates a generalized example of a computing environment, or high level technical architecture components, used to capture and store web replay data. One or more of the below-described techniques may be implemented in or involve one or more computer systems. The computing environment in FIG. 1 is not intended to suggest any limitation as to scope of use or functionality of described embodiments.

A web session may begin with a user 100 on a web browser 101 initiating the browser request 110 for a web document 150 from a web server 130. As the request is sent to the web server 130, the request may travel through a collective of routers across a network 105. The web server 130 may reside behind a network device 120, such as a load balancer, switch, or router.

In one embodiment, the traffic between the user 100 and web server 130 may be network mirrored 114 to the server-side capture engine 115. The server-side capture engine 115 may exist within the web server 130. In an embodiment where the web server 130 is operating in a cloud environment without administrative control of the network device 120, the web server 130 may copy and forward its packets to the server-side capture engine 115. In another embodiment, the client-side capture agent may send the DOM to the server-side capture engine directly.

Once the web server 130 has received the request, web server 130 may transmit a response 111 through the network device 120 and the network 105 for return to the user 100 web browser 101. The web server 130 may include within the response the HTML Document Object Model (DOM) 151 and an embedded client-side capture agent 152. In one embodiment, a web document can contain a reference to the capture agent (e.g., JavaScript code), which can then be fetched as a result. The capture agent could also be sent separately from the web document. Regardless, the capture agent would be sent in conjunction with the web document, such that the capture agent can capture data about the web document. Thus, the a capture agent can be received in conjunction with a delivery of the web document.

The server-side capture engine 115 stores a copy of the request and response from the web server 130 as 116, which may include the entire DOM 151. The server-side captured data can be stored in the server-side capture engine 115. Engine 115 may include a plurality of separate engines, such as the capture engine, an analysis engine, and a web session storage engine.

The embedded client-side capture agent 152 can monitor changes to the DOM 151 and user 100 interactions, such as mouse clicks, mouse movements, scrolling, and keyboard entry to relay action and changes through the initiation of additional browser requests 110 to the web server 130. Changes to DOM 151 and user interaction are examples of events associated with nodes in the DOM. When these requests return to the web server 130, they are captured by the server-side capture engine 115 and the client-side data is stored as 117, as detailed above for later reassembly and analysis.

Example embodiments of the embedded client-side capture agent 152 are further detailed below. The server-side capture engine and web session storage 115 can combine the data from the client-side agent 117 with the data from the captured server-side network traffic 116 to create an accurate representation of all user interface and user interaction events. The server-side capture engine 115 may use various combinations of IP address, referrer, session cookies, browser identifier, and operating system type to link web documents together into a session for replay.

II. Client-Side Capture

Server-side packet capture systems can capture the HTML/DOM sent to the browser. But, before the browser has completed loading the DOM sent from the server and captured server-side, the HTML may be modified using, perhaps, a client-side plugin or server-delivered scripts. Modern browser technology does not provide a method to distinguish which DOM nodes were modified client-side and which were delivered from the original HTML sent from and captured on the server-side. With this regard, using the full tree DOM path to address changes may lead to errors during replay and analysis when client-side scripts modify the DOM during the DOM load in the browser and prior to the capture agent loading.

To address this challenge, embodiments can determine identification information of a node associated with an event, and save that identification information with an event record. As an example of using identification information, embodiments can direct the capture agent to use the nearest uniquely identified ancestor node to uniquely name the path to the current modification. A uniquely identified node is a node that can be unambiguously identified without using a DOM path, such as an HTML element with an "id" attribute field. An example embodiment of this process is detailed in FIG. 3A. Embodiments can work backwards from the node to find the closest uniquely identifiable path.

Figure 2:
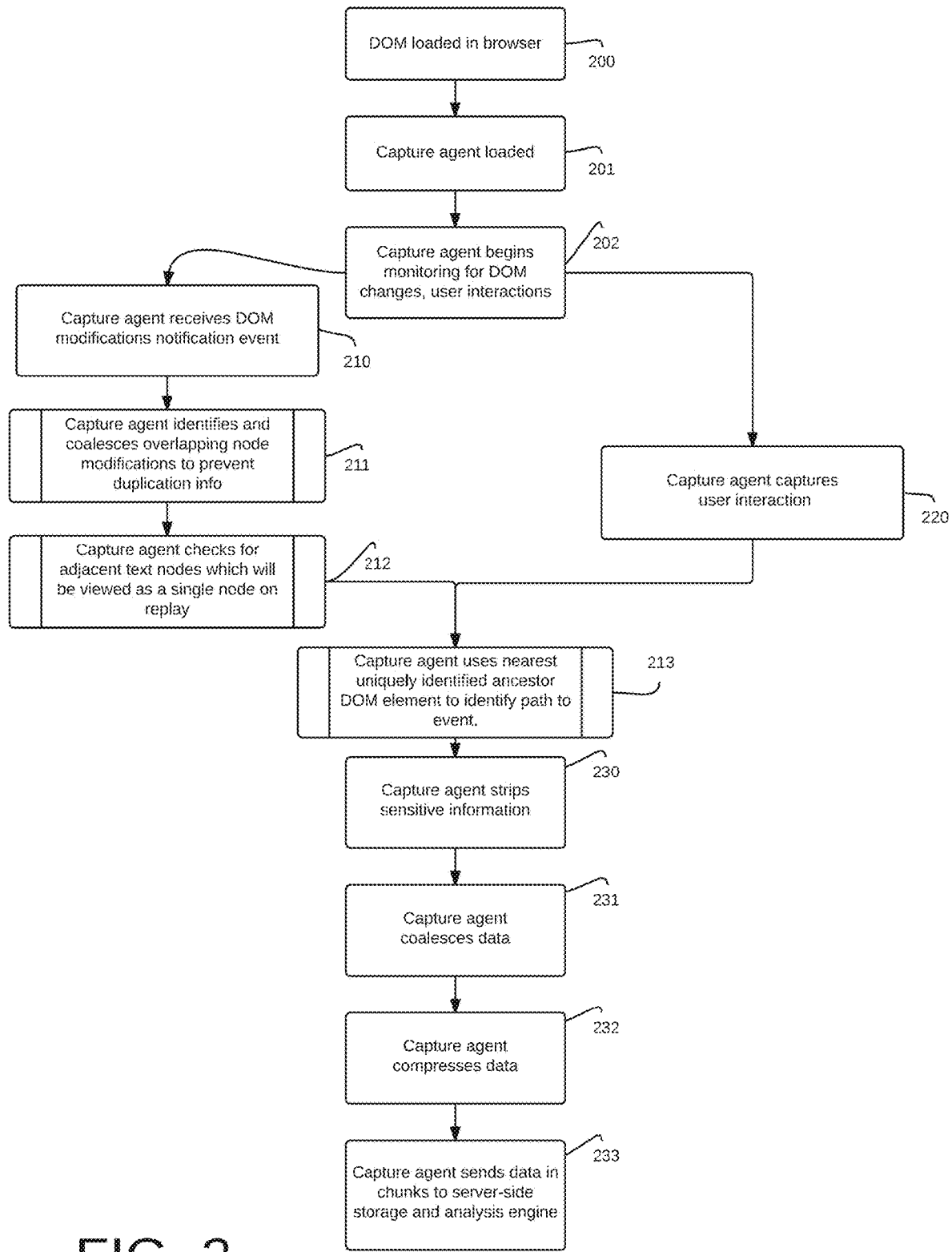
FIG. 2 depicts an example workflow of one embodiment of the client-side capture agent.

FIG. 2 illustrates an example workflow of one embodiment of the client-side capture agent. The example workflow can be used a method for tracking events associated with a web document on a client device.

At block 200, the DOM is loaded in the browser 200. Then, at block 201, the capture agent is loaded. For example, the browser can begin loading resources, including the HTML document, javascript, images, stylesheets and other data required to render the page. The HTML document parsed by the browser can include instructions to load the capture agent software into the browser.

At block 202, the capture agent begins monitoring for DOM changes (e.g., graphical user interface changes) and user interaction events. While processing changes and events, the capture agent may use memory available within the browser, or a permanent storage mechanism provided by the browser. Some events, such as mouse movements, may be sampled to a specific time resolution, such as 0.1 seconds, to reduce the amount of data collected. Other events, such as a mouse click, may not be sampled to ensure an accurate representation of the user's interactions.

At block 210, when the capture agent receives a DOM modification notification event, the capture agent begins to process the changes. The DOM modification notification event may contain multiple DOM changes. As examples, the DOM modification can include an addition of one or more nodes in the DOM, a removal of one or more nodes in the DOM, or a modification to one or more existing nodes in the DOM.

At block 211, to efficiently process the changes within the modification notification event, the capture agent ignores children node modifications for ancestor nodes which were modified and which required the DOM content to be sent to the server-side capture engine. An example embodiment of this process is detailed in FIG. 5.

At block 212, the capture agent looks for adjacent text nodes in additions, modifications, or removals that can be represented as one text node during replay. Example embodiments of these processes are detailed below in FIG. 6A and FIG. 7.

At block 213, the capture agent uses nearest uniquely identified ancestor DOM element to identify a path to the event. If the associated node has a unique identification, then an ancestor is not needed. Some embodiments can unambiguously identify a target node of DOM changes by constructing a sequence of node indexes by recursively taking the node index of the target node, then the node index of the target node's parent and so on until a node is reached that can be unambiguously identified through another means, such as the fact that the node is the root node of the entire DOM. In this description, this sequence of node indexes is called a "DOM path". A DOM path that ends with the root node of the entire DOM is called a "full tree DOM path".

At block 230, once the capture agent has identified modification(s) to send to the server-side capture, storage, and analysis engine, the capture agent may strip out sensitive information. The sensitive information may include elements such as passwords, credit cards, social security numbers, and other configured sensitive fields. Thus, the capture agent can strip sensitive information before transmitting the event records to the server-side web session storage engine.

At block 231, the capture agent may then assemble and coalesce the data, including meta information such as processing time, load time, and other situational information available within the browser, timestamps, and other information such as errors. It may coalesce the data (e.g., over a period of 5 seconds) by combining similar events and using short identifiers to optimize the information into the smallest amount of data bytes.

At block 232, the capture agent may compress the data in pre-determined chunks. Various compression algorithms are known to those skilled in the art, which trade time to compress vs compression efficiency. While one compression algorithm may be applicable today given today's CPU processing power available, in the future, a more time consuming algorithm may be more appropriate.

At block 233, the capture agent may send the data to the server-side storage and analysis engine. The server can use the data (e.g., as event records) to replay the changes. For example, the server can identify an event and the corresponding node. The server can then make that change and replay it. After receiving the event records at the server-side web session storage engine, the server-side web session storage engine can combine the event records with a server-side captured DOM of the web document to generate a modified DOM from an original unmodified DOM.

In some embodiments, the capture agent can store the event records in a client storage until the event records are transmitted to the server-side storage and analysis engine. The event records can be deleted after sending the event records to the server-side engine. Subsequent to deleting the event records, a plurality of additional events associated with nodes in the DOM can be captured. For each of the plurality of additional events, additional identification information of an additional associated node can be determined. The additional identification information can be stored in an additional event record. The capture agent can transmit the additional event records to the server-side web session storage engine.

In one embodiment, the client-side capture agent sends the data at pre-determined intervals or when the document is unloaded in the browser. The data can be sent at pre-determined intervals to ensure data is not lost in the browser or during transit. As another example, the client-side capture agent can send the data when there are no existing network requests.

At block 220, the capture agent may also receive user interaction events, such as keyboard entry, document resize, orientation changes, scroll events, mouse movements, or mouse clicks. In the case of keyboard entry, the capture agent may strip sensitive information from the data (event record) as detailed above. The user interaction data can follow a similar path as for DOM modifications detailed above in block 213 for the capture agent identifying the DOM node of the target of the events, in block 230 stripping sensitive information, in block 231 coalescing the data, in block 232 compressing the data, and in block 233 sending the data.

As examples, four different ways can be used in order to determine a unique identification. DOM node identifiers can be used. Embodiments may potentially use sibling or ancestor node identifiers. If the current node is not uniquely identified, one can go up to parents. Once embodiments start looking up at the parents, embodiments can look at siblings. Embodiments can look for a unique parent or sibling, such as the case where there is a parent that is, for example, a DIV (division in HTML) or a P (paragraph in HTML). And then inside the paragraph there are three spans. If none of them had unique identifications on them (e.g., no unique identifier), the DIV may have a unique identifier. But, if there is a change to the third span, embodiments can look to see that there are three span children and that current node is a third span child.

This can use both sibling or ancestor DOM node identifiers and DOM element attributes that are unique. This can use the order of the node among its siblings. Embodiments can also find DOM element attributes that are unique among sibling DOMs. For example, one span can have a text size of 25 and it is being modified to text size of 22, so that is how embodiments can uniquely identify it. When no sibling or ancestor node that has a unique DOM node identifier is identified, DOM element attributes that are unique among sibling DOM elements can be stored to identify a first node in the path to the associated node.

In one example with JavaScript, one might call out a specific identifier (e.g., a book) in JQuery. There might be a number of pages that are children in the book, and so a user might request the element of book and add a new child. So in other words, a user wants to add a new page. Thus, there are use cases where embodiments might address things where there is a unique identifier like book, the book tag or element, or node, and then address it from a perspective of children.

III. Uniquely Identifying a Node in a Dom Tree

A. Path to a Node in DOM Tree

Figure 3A:
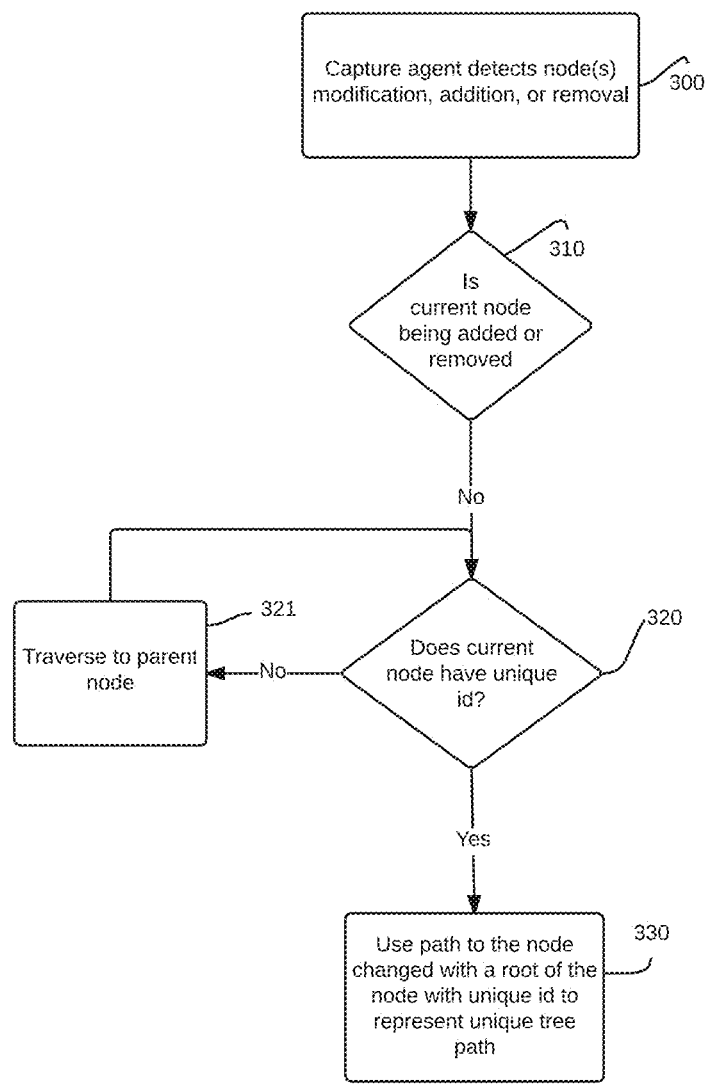
FIG. 3A depicts an example embodiment workflow for how embodiments can uniquely identify a DOM node in the DOM tree.

FIG. 3A depicts an example embodiment workflow for how embodiments can uniquely identify a DOM node in the DOM tree. Each node in a DOM has a well-ordered set of child nodes. Embodiments can define the node index of a node to be the ordinal number of the node in the well-ordered set of child nodes of its parent node, or of only child nodes of the same type as the target node (i.e., fifth span child referring to the fifth occurrence of the span node without regard to nodes of other types). A unique tree path of a target node exists so that one can recursively take the node index of the target node, and then the node index of its parent node and so on to construct a sequence leading up to an ancestor that has a unique node identifier, e.g. an "id" attribute.

At block 300, the capture agent receives the DOM modifications notification. The notification can be received in any suitable form, e.g., as a flag, a flag with a message, a message that include information about the modification, etc.

At block 310, when the capture agent receives the DOM modifications notification, the capture agent evaluates if the action is a node addition or removal. The DOM modification event can include indicators if the node is being added or removed.

At block 320, the capture agent may then look for a unique identifier on the DOM node, such as an 'id' attribute which would uniquely identify the node. Another example is combinations of attributes on a specific tag name, such as input[name="address1"], which would uniquely identify the input field for the address 1.

At block 321, the capture agent may begin to traverse the tree upwards looking for a unique identifier. The traversal may occur in any suitable order. For example, the tree can be traversed via each branch until an end is reached, and then a previous branch point not taken can be traversed.

At block 330, to identify the unique tree path to the modified node, the agent uses the path to the node changed with a root of the node with unique ID to represent the unique tree path. The path may be represented by node indexes such as those illustrated in FIG. 4 or FIG. 4A.

FIG. 3B illustrates an example HTML modification. Document 350 shows an example original HTML. At document 360, the example original HTML in document 350 has been modified, where "pending" has been modified to "approved". As an example, some embodiments can traverse to the parent in search of a unique "id" attribute of "response". Using the DIV with the "response" ID attribute as the root path, some embodiments can unambiguously identify the node which changed as the 2nd span child of "response", with the style attribute having a value of "color: blue". As another example, there can be a nearby node that might have a style tag (attribute), which says the font is 25 and we know there's only one nearby that has the style tag set as the font size of 25.

B. Node Index

To send and store DOM changes, the nodes to which the changes occur (i.e. the targets of the changes) can be unambiguously identified. Because each node in the DOM has a well-ordered set of child nodes, this can be accomplished by defining the node index of a node to be the ordinal number of the node in the well-ordered set of child nodes of the node's parent node. An example embodiment of the process of calculating the node index is detailed in FIGS. 4A and 4B. This can also be accomplished by defining the node index of a node to be the ordinal number of the node in the well-ordered set of child nodes, filtered for only child nodes of the same type as the target node, or of the node's parent node. An example embodiment of the process of calculating the node index for nodes of the same type is detailed in FIG. 4A.

Figure 4A:
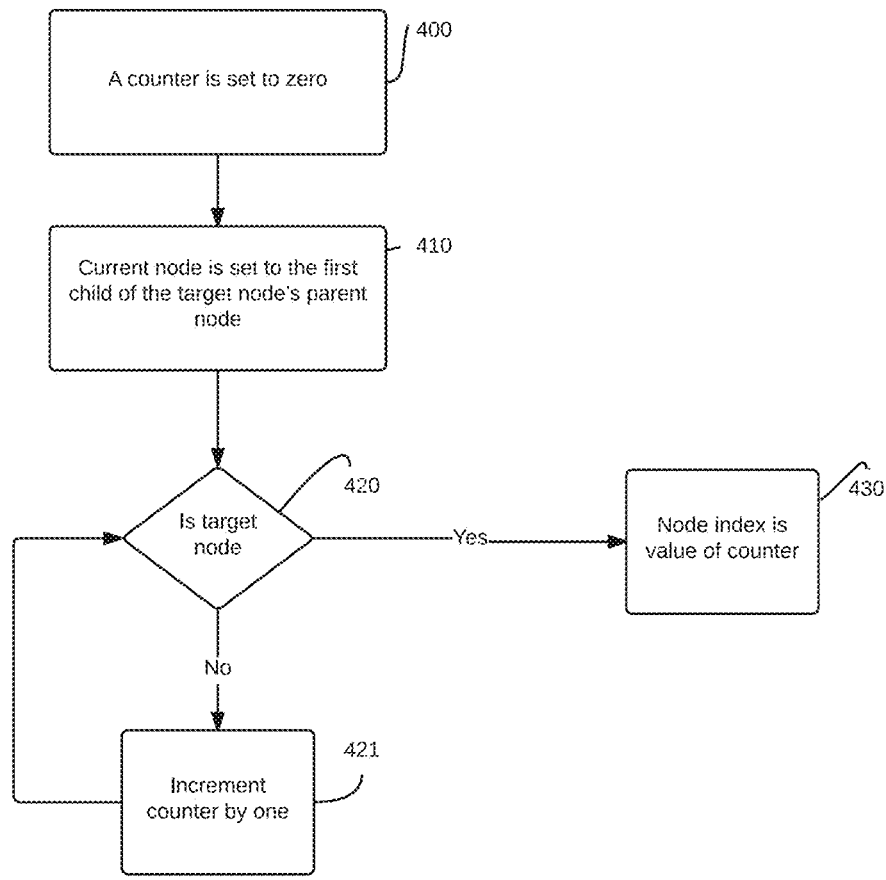
FIG. 4A illustrates an example embodiment workflow for calculating a node index.

FIG. 4A illustrates an example embodiment workflow for calculating a node index. An example result would represent the target node as the 4th child of the parent node.

At block 400, a counter is set to zero in the client-side agent. The counter can be stored in any suitable memory and associated with a process for calculating a node index.

At block 410, for the purposes of iteratively looping through the DOM tree to unambiguously identify the location of the node, a variable, or current node, is set to the first child of the target node's parent node, where the target node is the node to unambiguously identify.

At block 420, it is determined whether the current node is the target node, e.g., by comparing a reference, or memory location, of the node being evaluated to the reference, or memory location, of the node to unambiguously identify.

At block 421, the counter is incremented by one if the current node is not the target node. On the next iteration, the current node is changed to a next child of the target node's parent node.

At block 430, the final value of the counter is the node index. This index is used to create an unambiguous path from a uniquely identified node to the target node. Using FIG. 5B, an example of an unambiguous path is the first span child of the div tag with attribute of id="response" which would represent the span tag with the inner text of "Your application status is:".

Figure 4B:
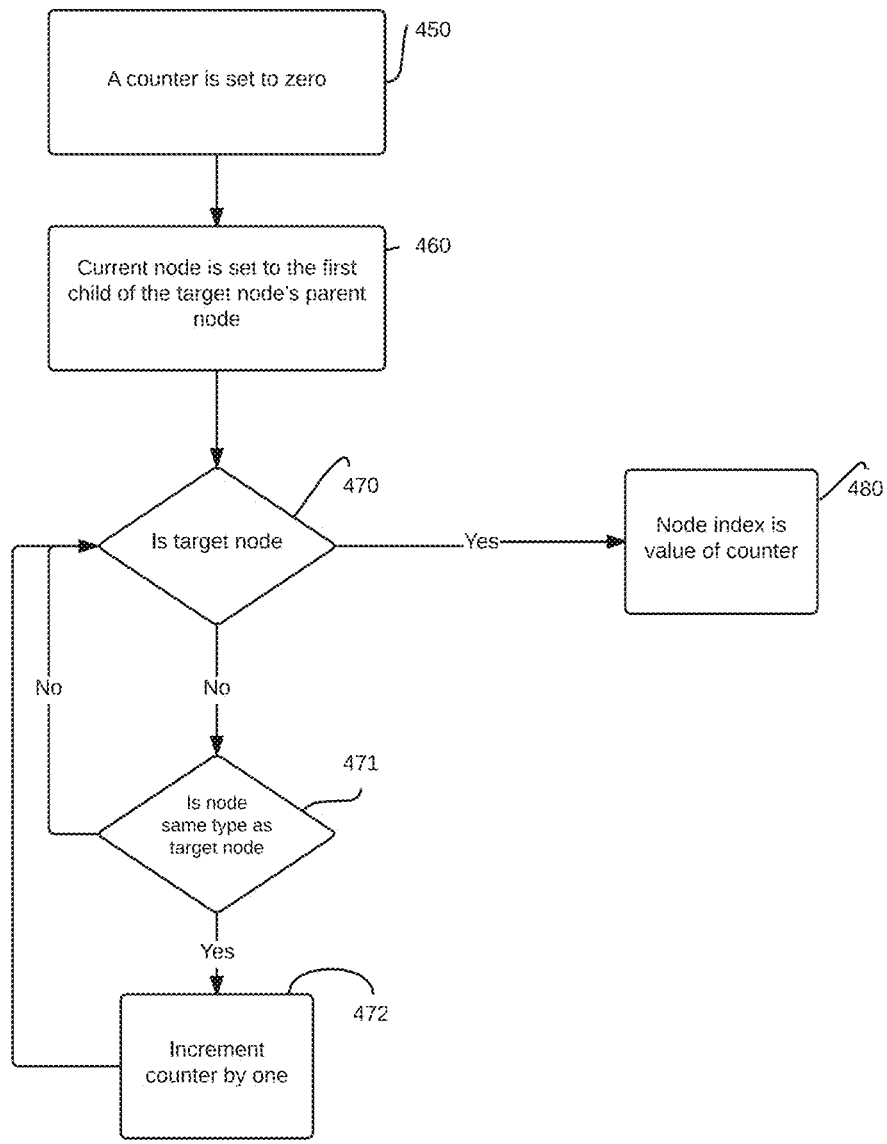
FIG. 4B illustrates an example embodiment workflow for calculating a node index by counting only the child nodes of the same type as the target node.

FIG. 4B illustrates another example embodiment workflow for calculating a node index, this time by counting only the child nodes of the same type as the target node. This embodiment can be used by the client-agent in place of FIG. 4A to provide an unambiguous path to the target node. An example result would represent the target node as the $3^{rd}$<p>, or paragraph, child of a parent node who had a unique identifier tag.

At block 450, a counter is set to zero in the client-side agent. The counter can be stored in any suitable memory and associated with a process for calculating a node index.

At block 460, for the purposes of iteratively looping through the DOM tree to unambiguously identify the location of the node, a variable, or current node, is set to the first child of the target node's parent node, where the target node is the node to unambiguously identify.

At block 470, it is determined whether the current node is the target node.

At block 471, it is determined whether the current node is a same node type as the target node. Two nodes share the same type when they have the same node tag. For example, to nodes would be the same type if they were both "<span>" nodes.

At block 472, if the current node is not the target node 470, and if the current node is the same type of node as the target node 471, the counter is incremented by one.

At block 480, if the node is the target node 470, the final value of the counter is the node index.

IV. Overlapping Modifications

Figure 5A:
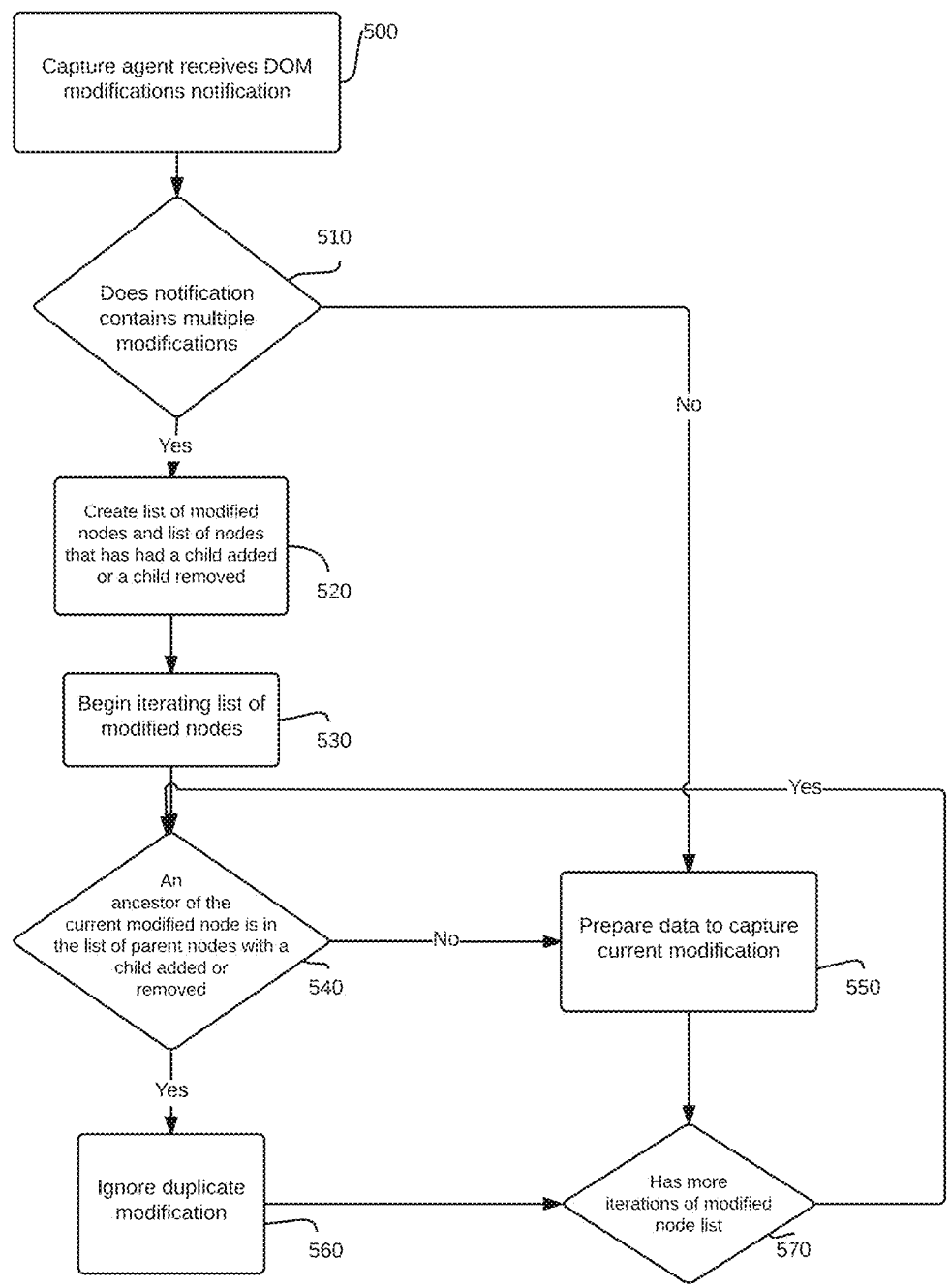
FIG. 5A depicts an example embodiment workflow for how embodiments can prevent transmission of overlapping modification notifications.

FIG. 5A depicts an example embodiment workflow for how embodiments can prevent transmission of overlapping modification notifications.

At block 500, when the capture agent receives the DOM modifications notification, the notification may contain multiple modifications. For the purposes of efficiently, modern day browsers currently send DOM modifications in groups of changes. The capture agent analyzes the set of changes to suppresses duplicate information from overlapping modifications.

At block 510, the capture agent evaluates if the notification event contains multiple events, e.g., by examining the length of the array of changes.

At block 520, if the capture agent does contain multiple events, the capture agent creates a first list of modified nodes and a second list of parent nodes that has had a child added or a child removed. Thus, the modified nodes of the first list already existed and attributes of the node itself have been modified. The nodes of the second list have had a child node added or removed. It is possible that nodes can be in both lists, in the case where a node is added and then removed. In this case, the capture agent will ignore the node modification altogether as the end status of the node is removed.

At block 530, the capture agent iterates over the first list of modified nodes.

At block 540, at each iteration, the capture agent checks if an ancestor of the current node is in the second list of parent nodes with a child added or removed.

At block 560, if the ancestor of the current node is in the list of parent nodes with a child added or removed from block 540, the current modification may be ignored by the capture agent, as this modification may already be sent with the ancestor changes.

At block 550, if the current node does not have an ancestor in the list of parent nodes with a child added or removed from block 540, or if the notification event did not contain multiple events from block 510, then the modification data is prepared to later send to the server-side storage and analysis engine.

At block 570, the capture agent continues to iterate over all the modified nodes until complete. Accordingly, the capture agent can identify overlapping modification events, and store only one event record for the overlapping modification events. In one embodiment, a modification of a single ancestor node can represent overlapping modification events targeting a single ancestor node subtree. For instance, overlapping modifications can be within a single parent node that has more than one child or extended grandchildren that has been modified (and thus overlapping with the modification of the ancestor which must be serialized). An example is when A has two children B and C. B has one child D. C has two children F and G. F has one child H. H has three children I, J, and K. If there is a modification to J, G, and C, embodiments only need to send the modification for C as it would contain all modification of C (i.e., including any modification of F, G, H, I, J, and K), and thus there is no need to record J and G changes.

FIG. 5B illustrates an example DOM change with multiple node modifications. Document 580 shows an example original HTML. At document 590, the example original HTML of document 580 has been modified, where "pending" has been removed and 7 additional nodes have been added. As an example, some embodiments can summarize the entire modification as a single modification to the unambiguously identified node of the $2^{nd}$ span child of "response", with the style attribute having a value of "color: blue". The node addition notifications can be suppressed as they are all contained in the single node modification.

V. Merging Text

To send and store DOM changes, the changes can be serialized. In one embodiment, the serialization of a node being added may include the identifier of the parent of the target node as obtained by the process detailed above, the node index of the new node, and the HTML representation of the node and its children. Obtaining the HTML representation of a DOM node can be done in a computationally efficient manner as this is a native feature in modern browsers and is performed with machine code rather than JavaScript. The drawback is that this HTML representation is ambiguous about whether contiguous text is represented as one text node in the DOM (the "canonical" form of the DOM) or as multiple text nodes. DOM modification as a result of user interaction or user interface changes may cause multiple sibling text nodes to appear through the addition and modification of text nodes. These adjacent nodes are represented as a single node during replay and can lead to errors if not properly managed during capture.

To address this challenge, changes are serialized in such a manner so that an agent replaying or analyzing the serialized changes may assume that the beginning state of any set of changes is a canonical DOM: that is, there are no adjacent text nodes being that all of them are merged together. Note that the serialized changes themselves may render the DOM non-canonical, but it is assumed that the DOM is changed to return to a canonical state before the next set of serialized changes. This may be affected with three additions to the way DOM changes are serialized:

When text nodes are modified, if the modification's target is a text node that has adjacent text nodes, a modification to a "virtual text node" that combines the adjacent text nodes into one text node positioned at the beginning of the sequence of contiguous text nodes is serialized instead of a modification to the actual target text node. An example embodiment of this process is detailed in FIGS. 6A and 6B.

For purposes of calculating node indexes, adjacent text nodes are counted as one text node, the canonical node. An example embodiment of the process of determining the canonical node index is detailed in FIG. 7.

For the addition of any node between two adjacent text nodes, the capture agent can also serialize a modification to the DOM such that the virtual text node combining the two adjacent text nodes are split into two or more text nodes, with at least one of the breaks occurring where the new DOM node is added. In one embodiment, a text node modification may be serialized for the virtual text node that removes the text that belongs to the text nodes appearing after the DOM node being added. A DOM node addition may be serialized to add a text node with the previously removed text after the virtual text node. Finally, a DOM node addition can be serialized for the DOM node being added between the two text nodes. An example embodiment of this process is detailed in FIG. 8.

This section particularly relates to the way embodiments can serialize additions of DOM nodes as the HTML of the node and its children. A possible drawback is that this serialization may be ambiguous about whether contiguous text in the serialization is represented as one text node in the DOM or as multiple text nodes. A solution is to always serialize changes such that the beginning state of any change we serialize is a canonical DOM (that is, there are no adjacent text nodes, all of them being merged together).

A. Method

Figure 6A:
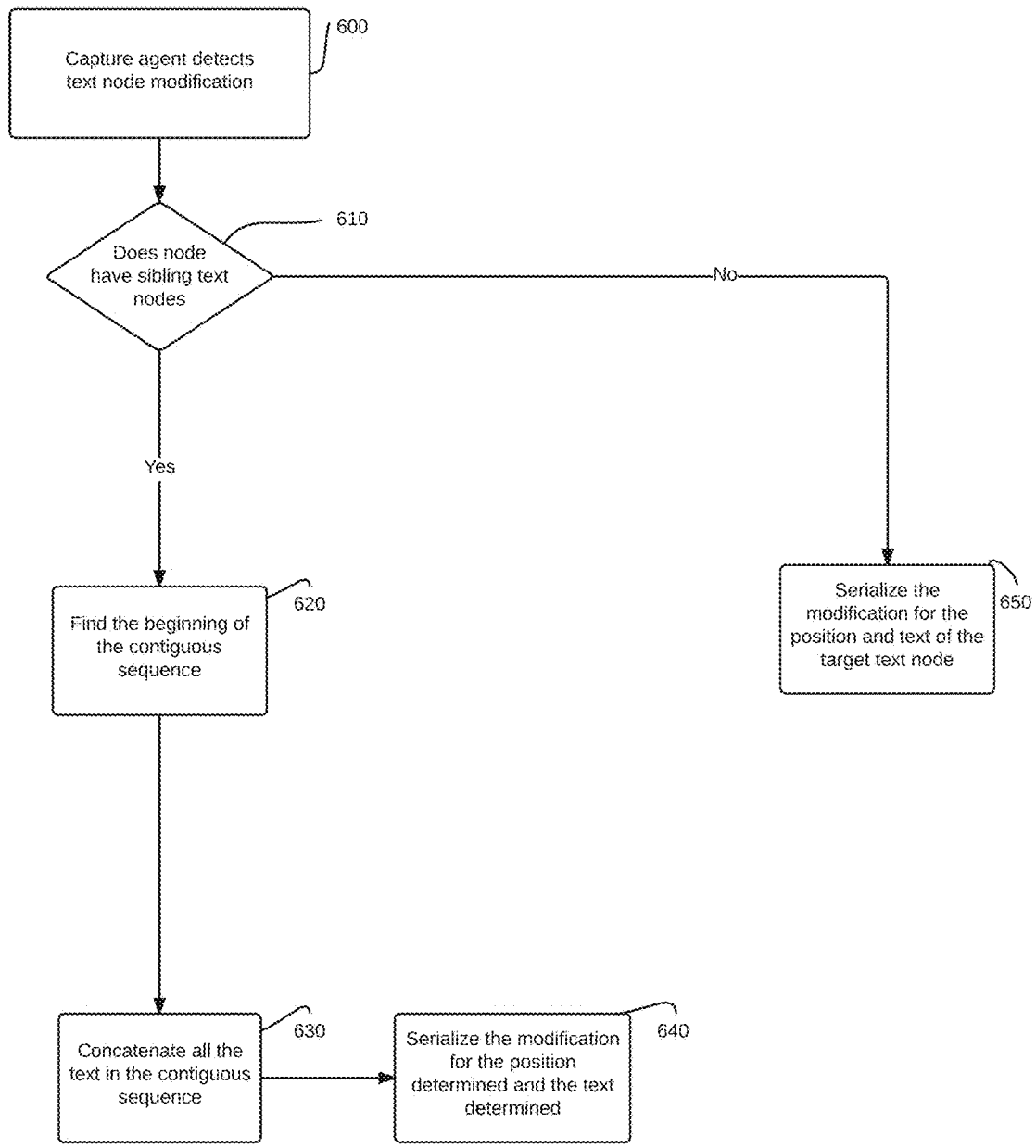
FIG. 6A illustrates an example embodiment workflow for how embodiments can address DOM text node modifications for text nodes which have adjacent text nodes.

FIG. 6A illustrates an example embodiment workflow for how embodiments can address DOM text node modifications for text nodes which have adjacent text nodes.

At block 600, the capture agent detects a text node modification. For example, the capture agent can review the node types declared on each node in the list of modifications to determine if any of the nodes are of type text node.

At block 610, the capture agent determines if there are sibling text nodes. If so, the capture agent may serialize the modification as if it occurred to a single virtual text node that combines the contiguous sequence of text nodes including the text node for which the change was detected. The modification can be depicted as positioned at the start of the contiguous sequence of text nodes.

At block 620, the capture agent finds the beginning of the contiguous sequence. The beginning of the sequence is the first node in the ordered list of nodes that is of type text node.

At block 630, the capture agent concatenates all the text in the contiguous sequence.

At block 640, the capture agent then serializes the modification for the position determined in block 620 and the text determined in block 630. Accordingly, the capture agent can merge adjacent sibling DOM text nodes into a single node for identification of the associated node of an event. In one embodiment, the serialization may be a text representation of the text of the modified node. In another embodiment, serialization may be to a structure stream of data which may include other attributes of the text node to ensure fidelity of the all of the node's data.

At block 650, if there were no sibling text nodes, the capture agent serializes the modification for the position and text of the target text node.

B. Example

Figure 6B:
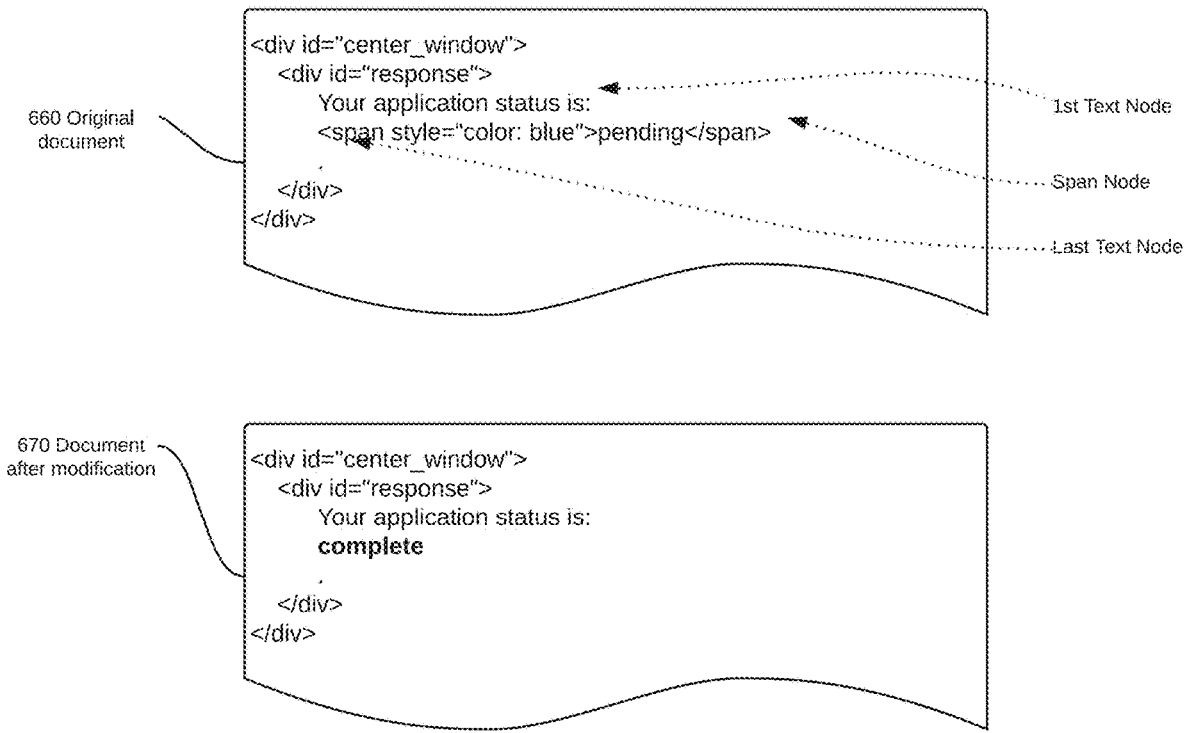
FIG. 6B illustrates an example HTML change with adjacent text nodes.

FIG. 6B illustrates an example DOM change with adjacent text nodes. Document 660 shows an example original HTML with adjacent text nodes with a span node in between. At document 670, the example original HTML of document 660 has been modified, where the span containing "pending" has been removed and replaced with the word "complete". As an example, some embodiments can identify the three adjacent text nodes and summarize the modification as a removal of the span node, removal of the last text node, and a modification to the first text node containing the text of all three text nodes.

C. Canonical Node Index

Figure 7:
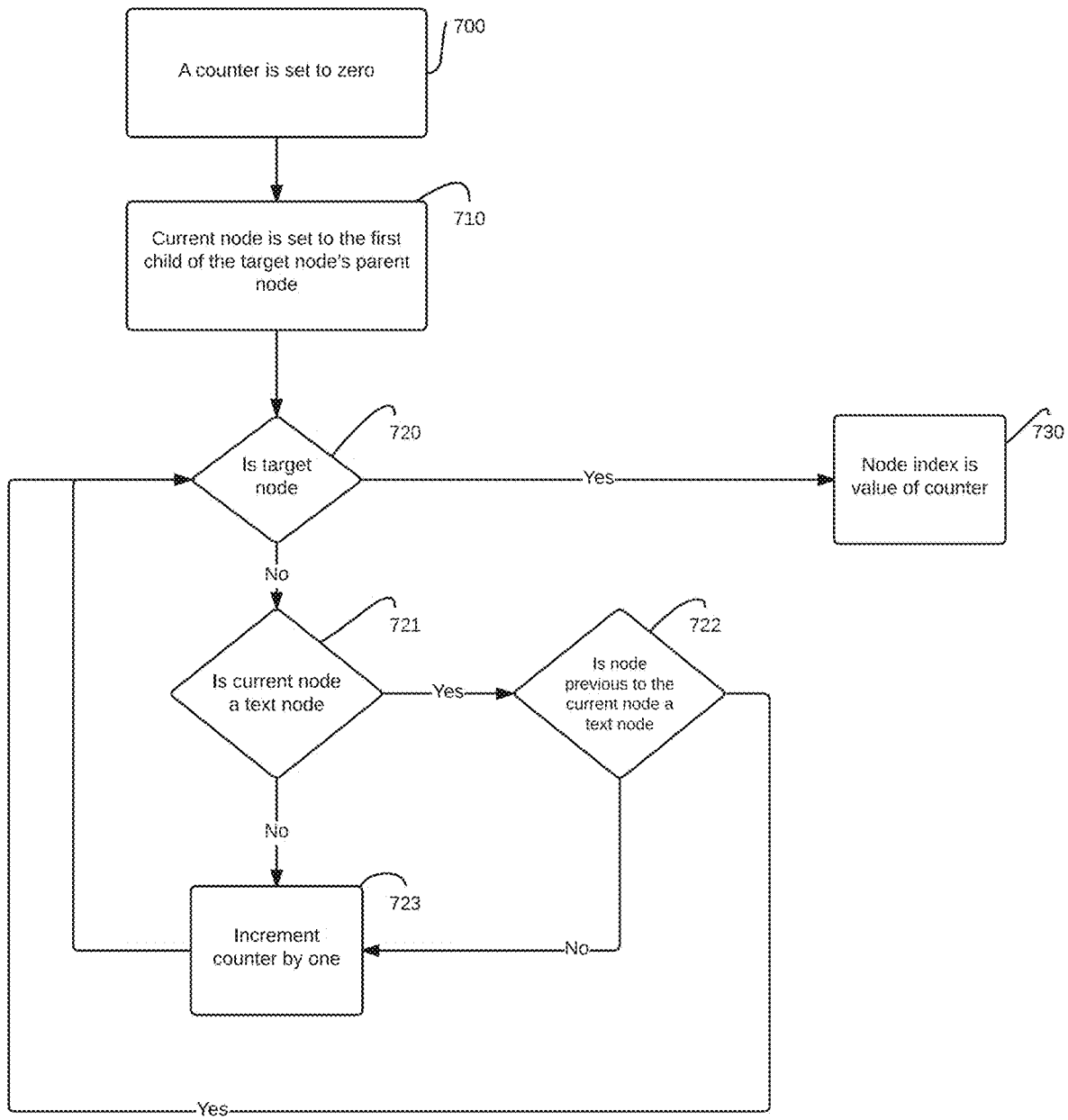
FIG. 7 illustrates an example embodiment workflow for calculating a canonical node index.

FIG. 7 illustrates an example embodiment workflow for calculating a canonical node index. The canonical node index represents the index at which the text node, or set of text nodes, is uniquely identified as it will be represented in the DOM tree during replay. During replay of DOM changes, two adjacent text nodes can appear as a single text node, and the canonical node index can enable the merging of text by accounting for adjacent text nodes. Because the replay of DOM changes will have nodes represented differently than during capture, it can be important to keep track of the canonical node index so that the replay can associate the indexed nodes identified in capture with their proper location in the DOM tree during replay.

At block 700, a counter is set to zero in the client-side agent.

At block 710, for the purposes of iteratively looping through the DOM tree to unambiguously identify the location of the node, the current node is set to the first child of the target node's parent node, where the target node is the node to unambiguously identify.

At block 720, a loop is created while the current node is not the target node.

At block 721, it is determined whether the current node is a text node. If the current node is not a text node, the counter is incremented by one at block 723. If the current node is not a text node, the method proceeds to block 722.

At block 722, it is determined whether the node previous to the current node is a text node. If the previous node is not a text node, the counter is incremented by one at block 723

At block 730, the final value of the counter is the node index.

D. Serialization

Figure 8:
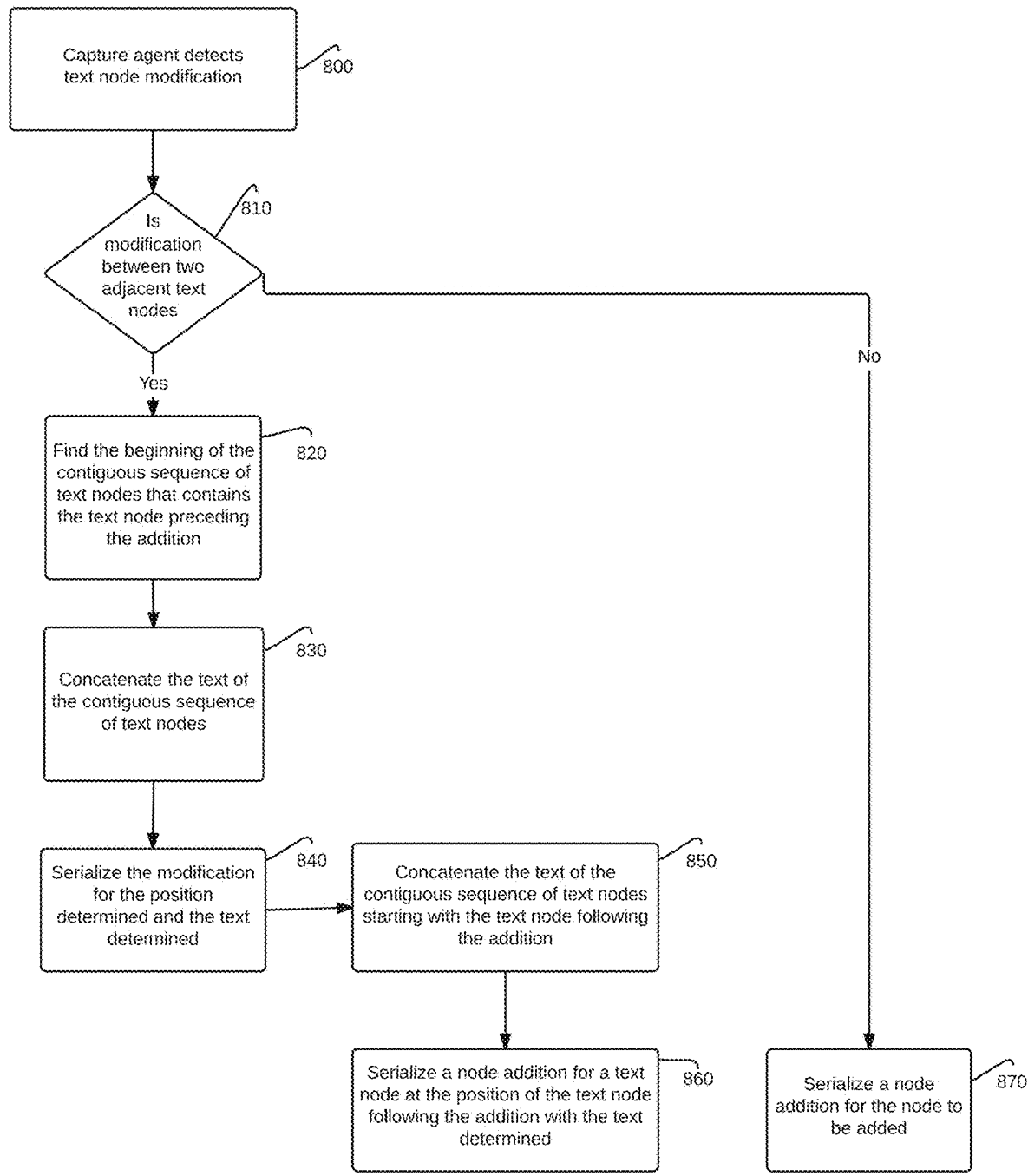
FIG. 8 illustrates an example embodiment workflow for serialization of a DOM node addition modification that occurs between two adjacent text nodes.

FIG. 8 illustrates an example embodiment workflow for serialization of a DOM node addition modification that occurs between two adjacent text nodes. As two adjacent text nodes will appear as a single node during replay, a text node addition next to an adjacent text node must be recorded as a single merged text node modification.

At block 810, after the capture agent detects a DOM node addition modification 800, the capture agent may evaluate if it is between two adjacent text nodes. For example, if the node has sibling nodes, the capture agent can check if either of the adjacent nodes is of type text node.

At block 820, if the modification is between two adjacent text nodes, the capture agent can find the beginning of the contiguous sequence of text nodes that contains the text node preceding the addition. To do so, the capture agent can iterate through the list of sibling nodes, checking for type of text node. The iteration in either direction can stop once a non-text node is reached or the end of the sibling list in that direction is reached.

At block 830, the capture agent can concatenate the text of the contiguous sequence of text nodes that starts at the determining beginning of the contiguous sequence.

At block 840, the capture agent may then serialize the text from the position determined in 820 and the text determined in 830. This text represents the entirety of the text node that will be seen from the replay's perspective, where all contiguous text nodes will be a single text node. An example would be where the following nodes exist:

```
<div>
  Welcome to
  <br>
  Quantum Metric
  <br>
  2015
</div>
```

If a modification occurred removing the two <br> nodes, the "Welcome to", "Quantum Metric", and "2015" nodes would continue to be adjacent nodes during the capture, and they would continue to be represented as 3 distinct text nodes. During replay, these 3 text nodes would be a single text node "Welcome to Quantum Metric 2015".

At block 850, the capture agent may then concatenate the text of the contiguous sequence of text nodes starting with the text node following the addition.

At block 860, the capture agent may then serialize a node addition to the text representation of the text contained in the text node, for a text node at the position of the text node following the addition with the text determined in 850.

At block 870, if the modification is not between two adjacent text nodes, the capture agent may then serialize a node addition for the node to be added, where in contrast to when other text nodes are adjacent, the text node is treated similarly to other node additions.

VI. Computer System

Any of the computer systems mentioned herein may utilize any suitable number of subsystems. Examples of such subsystems are shown in FIG. 9 in computer apparatus 10. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 9 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of instructions from system memory 72 or the storage device(s) 79 (e.g., a fixed disk, such as a hard drive or optical disk), as well as the exchange of information between subsystems. The system memory 72 and/or the storage device(s) 79 may embody a computer readable medium. Another subsystem is a data collection device 85, such as a camera, microphone, accelerometer, and the like. Any of the data mentioned herein can be output from one component to another component and can be output to the user.

A computer system can include a plurality of the same components or subsystems, e.g., connected together by external interface 81 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The features and advantages described in the detailed description are not all inclusive and, in particular, many additional features and advantages will be apparent to one of ordinary skill in the art in view of the drawings, detailed description, and claims. Moreover, it should be noted that the language used in the detailed description has been principally selected for readability and instructional purposes, and may not have been selected to delineate or circumscribe the inventive subject matter.

Note that in this description, references to "one embodiment," "an embodiment" or "some embodiments" mean that the feature being referred to is included in at least one embodiment of the invention. Further, separate references to "one embodiment" or "some embodiments" in this description do not necessarily refer to the same embodiment(s); however, neither are such embodiments mutually exclusive, unless so stated and except as will be readily apparent to those skilled in the art. Thus, the invention can include any variety of combinations and/or integrations of the embodiments described herein. However, other embodiments of the invention may be directed to specific embodiments relating to each individual aspect, or specific combinations of these individual aspects.

Upon reading this detailed description, those of skill in the art will appreciate still additional alternative structural and functional designs for a system and method for accurate and efficient capture of user interface and user interaction events on a remote web document through the disclosed principles of the present invention. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

What is claimed is:

1. A method for tracking events associated with a web document on a client device, the method comprising performing, by the client device:
   receiving, from a web server, the web document at the client device, the web document having nodes in a Document Object Model (DOM), wherein the DOM is a tree data structure;
   capturing, by a capture agent, a plurality of events associated with a plurality of nodes in the DOM, wherein each of the plurality of events includes one or more changes to the DOM, wherein the plurality of events include user interactions on the web document;
   for each of the plurality of events:
      determining a timestamp for the event;
      determining identification information of an associated node, wherein the associated node is associated with the one or more changes to the DOM, and
      storing the identification information, the timestamp, and the one or more changes in an event record; and
   transmitting, from the capture agent, the event records to a server-side web session storage engine for replaying the user interactions according to the timestamps of the plurality of events.

2. The method of claim 1, wherein determining the identification information of the associated node includes:
   searching for a unique DOM node identifier of the associated node.

3. The method of claim 2, further comprising:
   when the unique DOM node identifier is not found for the associated node:
      searching for a sibling or ancestor node that has a unique DOM node identifier;
      when the sibling or ancestor node that has the unique DOM node identifier is identified, determining a path from the sibling or ancestor node to the associated node; and
      storing the unique DOM node identifier of the sibling or ancestor node and the path in the event record.

4. The method of claim 3, wherein the path includes an order of the associated node among its siblings.

5. The method of claim 3, further comprising:
   when no sibling or ancestor node that has the unique DOM node identifier is identified:
      storing DOM element attributes that are unique among sibling DOM elements to identify a first node in the path to the associated node.

6. The method of claim 2, further comprising:
   when the unique DOM node identifier is not found:
      storing DOM element attributes of the associated node that are unique.

7. The method of claim 1, wherein the plurality of events include at least one of: an addition of one or more nodes in the DOM or a removal of one or more nodes in the DOM.

8. The method of claim 1, further comprising:
receiving the event records at the server-side web session storage engine; and
combining, by the server-side web session storage engine, the event records with a server-side captured DOM of the web document to generate a modified DOM from an original unmodified DOM.

9. The method of claim 8, wherein the server-side captured DOM of the web document is received by the server-side web session storage engine from the web server.

10. The method of claim 1, further comprising:
identifying, by the capture agent, overlapping modification events; and
storing only one event record for the overlapping modification events.

11. The method of claim 10, wherein a modification of a single ancestor node represents overlapping modification events targeting a single ancestor node subtree.

12. The method of claim 1, further comprising:
merging, by the capture agent, adjacent sibling DOM text nodes into a single node for identification of the associated node of an event.

13. The method of claim 1, further comprising:
storing, by the capture agent, the event records in client storage until the event records are transmitted to the server-side web session storage engine; and
deleting the event records after sending the event records to the server-side web session storage engine.

14. The method of claim 13, further comprising:
subsequent to deleting the event records, capturing a plurality of additional events associated with nodes in the DOM;
for each of the plurality of additional events:
determining additional identification information of an additional associated node, and
storing the additional identification information in an additional event record; and
transmitting, from the capture agent, the additional event records to the server-side web session storage engine.

15. The method of claim 1, further comprising:
displaying the web document by a web browser, wherein the capture agent sends the event records when the web browser is not making any other network requests.

16. The method of claim 1, further comprising:
compressing, by the capture agent, the event records before transmitting the event records to the server-side web session storage engine.

17. The method of claim 1, further comprising:
stripping, by the capture agent, sensitive information before transmitting the event records to the server-side web session storage engine.

18. The method of claim 1, wherein the capture agent is received from a third party server using information from the web server.

19. The method of claim 1, wherein the capture agent is received separately from a delivery of the web document.

20. The method of claim 1, wherein capturing the plurality of events associated with the plurality of nodes in the DOM includes:
determining, by the capture agent, a first node modification and a second node modification to be an overlapping modification based on a first node being an ancestor of a second node in the DOM tree, the first node modification targeting a subtree of the DOM tree including the second node.

21. The method of claim 1, wherein the method further comprises:
generating, by the capture agent, an event record for a DOM tree modification, the event record including a first identification information for uniquely identifying a first node and a first node modification, the event record suppressing duplicate information by not including a second node modification based on a determination that the first node modification and the second node modification are overlapping.

22. A computer product comprising a computer readable medium storing a plurality of instructions for controlling a client device to perform a method to track events associated with a web document on the client device, the method comprising:
receiving, from a web server, the web document at the client device, the web document having nodes in a Document Object Model (DOM), wherein the DOM is a tree data structure;
capturing, by a capture agent, a plurality of events associated with a plurality of nodes in the DOM, wherein each of the plurality of events includes one or more changes to the DOM, wherein the plurality of events include user interactions on the web document;
for each of the plurality of events:
determining a timestamp for the event;
determining identification information of an associated node, wherein the associated node is associated with the one or more changes to the DOM, and
storing the identification information, the timestamp, and the one or more changes in an event record; and
transmitting, from the capture agent, the event records to a server-side web session storage engine for replaying the user interactions according to the timestamps of the plurality of events.

23. The computer product of claim 22, wherein determining the identification information of the associated node includes:
searching for a sibling or ancestor node that has a unique DOM node identifier; and
when no sibling or ancestor node that has a unique DOM node identifier is identified:
storing DOM element attributes that are unique among sibling DOM elements to identify a first node in a path to the associated node.

24. The computer product of claim 22, wherein determining the identification information of the associated node includes:
searching for a unique DOM node identifier of the associated node; and
when the unique DOM node identifier is not found:
storing DOM element attributes of the associated node that are unique.

25. The computer product of claim 22, wherein the plurality of events include at least one of: an addition of one or more nodes in the DOM or a removal of one or more nodes in the DOM.

26. The computer product of claim 22, wherein the method further comprises:
receiving the event records at the server-side web session storage engine; and
combining, by the server-side web session storage engine, the event records with a server-side captured DOM of the web document to generate a modified DOM from an original unmodified DOM.

27. The computer product of claim 26, wherein the server-side captured DOM of the web document is received by the server-side web session storage engine from the web server.

28. The computer product of claim 22, wherein the method further comprises:
identifying, by the capture agent, overlapping modification events; and
storing only one event record for the overlapping modification events.

29. The computer product of claim 22, wherein capturing the plurality of events associated with the plurality of nodes in the DOM includes:
determining, by the capture agent, a first node modification and a second node modification to be an overlapping modification based on a first node being an ancestor of a second node in the DOM tree, the first node modification targeting a subtree of the DOM tree including the second node.

30. The computer product of claim 22, wherein the method further comprises:
generating, by the capture agent, an event record for a DOM tree modification, the event record including a first identification information for uniquely identifying a first node and a first node modification, the event record suppressing duplicate information by not including a second node modification based on a determination that the first node modification and the second node modification are overlapping.

* * * * *